United States Patent
Lee (10) Patent No.: US 11,708,009 B2
(45) Date of Patent: Jul. 25, 2023

(54) ECO-FRIENDLY VEHICLE AND METHOD OF CONTROLLING THE SAME

(71) Applicants: HYUNDAI MOTOR COMPANY, Seoul (KR); KIA CORPORATION, Seoul (KR)

(72) Inventor: Myoungjun Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 292 days.

(21) Appl. No.: 17/240,264

(22) Filed: Apr. 26, 2021

(65) Prior Publication Data

US 2022/0063445 A1 Mar. 3, 2022

(30) Foreign Application Priority Data

Aug. 26, 2020 (KR) .................. 10-2020-0107625

(51) Int. Cl.
*B60L 58/26* (2019.01)
*G06F 17/18* (2006.01)

(52) U.S. Cl.
CPC .............. *B60L 58/26* (2019.02); *G06F 17/18* (2013.01); *B60L 2200/36* (2013.01); *B60L 2240/545* (2013.01)

(58) Field of Classification Search
CPC ................. B60L 58/26; B60L 2200/36; B60L 2240/545; G06F 17/18
See application file for complete search history.

(56) References Cited

U.S. PATENT DOCUMENTS

| | | | |
|---|---|---|---|
| 2020/0290464 A1* | 9/2020 | Oh | B60W 30/18127 |
| 2021/0213798 A1* | 7/2021 | Mackenzie | H01M 10/625 |
| 2022/0126704 A1* | 4/2022 | Flaum | B60L 15/2009 |
| 2022/0169252 A1* | 6/2022 | Yhr | B60L 58/14 |
| 2022/0258708 A1* | 8/2022 | Hanslik | B60T 8/323 |
| 2022/0340015 A1* | 10/2022 | Kapp | H01M 10/00 |

FOREIGN PATENT DOCUMENTS

KR 2018-0094014 A 8/2018

* cited by examiner

*Primary Examiner* — Brian L Swenson
(74) *Attorney, Agent, or Firm* — McDonnell Boehnen Hulbert & Berghoff LLP

(57) ABSTRACT

The disclosure relates to an eco-friendly vehicle and a method of controlling the eco-friendly vehicle, and optimizing the temperature of the battery of the eco-friendly vehicle towing the vehicle to be towed. The method of controlling the eco-friendly vehicle includes measuring, by a controller, a temperature of a battery during towing driving while a vehicle to be towed is connected, applying, by the controller, the measured battery temperature to a predetermined function to obtain a trend of battery temperature change, predicting, by the controller, a point in time when the temperature of the battery exceeds a predetermined reference temperature based on the trend of battery temperature change, and starting, by the controller, cooling the battery before reaching the predicted excess point.

21 Claims, 8 Drawing Sheets

| TIME (y) | BATTERY TEMPERATURE (x) |
|---|---|
| 0 | 30 |
| 5 | 31 |
| 28 | 32 |
| 36 | 33 |
| ⋮ | ⋮ |

ECO-FRIENDLY VEHICLE AND METHOD OF CONTROLLING THE SAME

CROSS REFERENCE TO RELATED APPLICATIONS

This application is based on and claims priority under 35 U.S.C. § 119 to Korean Patent Application No. 10-2020-0107625, filed on Aug. 26, 2020, the disclosure of which is incorporated herein by reference.

BACKGROUND

Field

The disclosure relates to a vehicle, and more particularly, to an eco-friendly vehicle having a towing device capable of towing a vehicle to be towed and using power from a battery as energy.

2. Description of Related Art

As the population who enjoys leisure activities such as camping and travel increases, a demand for trailers that are separately connected to vehicles for storage of various items or for mobile accommodations is also increasing.

Typically, the trailer is coupled to the vehicle using a coupling device provided at a rear of the vehicle, and is moved by a towing force of the vehicle. That is, the typical trailer has only a wheel and a rotating shaft, and does not generate separate power for driving the wheel by itself.

As described above, since the typical trailer does not have a separate power source for driving the wheel itself, when the trailer is towed by the vehicle, an overload of a power system of the vehicle to be towed by a weight of the trailer may become an issue. When the vehicle towing the trailer is an eco-friendly vehicle equipped with a motor and a battery, a temperature of the battery is excessively increased due to the overload of the battery due to the towing of the trailer.

SUMMARY

An aspect of the disclosure is to optimize a temperature of a battery of an eco-friendly vehicle towing a vehicle to be towed.

Additional aspects of the disclosure will be set forth in part in the description which follows and, in part, will be obvious from the description, or may be learned by practice of the disclosure.

According to an aspect of the disclosure, there is provided a method of controlling an eco-friendly vehicle including measuring, by a controller, a temperature of a battery during towing driving while a vehicle to be towed is connected, applying, by the controller, the measured battery temperature to a predetermined function to obtain a trend of battery temperature change, predicting, by the controller, a point in time when the temperature of the battery exceeds a predetermined reference temperature based on the trend of battery temperature change, and starting, by the controller, cooling the battery before reaching the predicted excess point.

The method may further include comparing, by the controller, a learned fuel economy of the eco-friendly vehicle with a current fuel economy and determine that the vehicle to be towed is connected to the eco-friendly vehicle in response to the current fuel economy being relatively lower than the learned fuel economy.

The method may further include identifying, by the controller, the connection of the vehicle to be towed from information directly input by a user through a user interface.

The method may further include comparing, by the controller, a braking current and determine that the vehicle to be towed is connected to the eco-friendly vehicle in response to an increase of the braking current increases by more than a preset size.

The method may further include comparing, by the controller, a current consumption of the battery and determine that the vehicle to be towed is connected to the eco-friendly vehicle in response to an increase in the current consumption of the battery by more than a preset size.

The method may further include determining, by the controller, that the vehicle to be towed is connected to the eco-friendly vehicle from the generation of a towing flag generated when the eco-friendly vehicle and the vehicle to be towed are connected.

The method may further include immediately starting, by the controller, cooling of the battery in response to a case where the temperature of the battery has already exceeded the predetermined reference temperature.

The method may further include waiting, by the controller, before reaching the predicted excess point in response to the case where the temperature of the battery has not yet exceeded the predetermined reference temperature, and then starting cooling the battery before reaching the predicted excess point.

The predetermined function may be provided using regression analysis.

The regression analysis may include either a Lagrange interpolation method or a least squares method.

According to another aspect of the disclosure, there is provided an eco-friendly vehicle including a motor configured to drive wheels, a battery configured to store power for driving the motor, a battery cooler configured to cool the battery, and a controller configured to measure a temperature of the battery during towing driving while a vehicle to be towed is connected, to apply the measured battery temperature to a predetermined function to obtain a trend of battery temperature change, to predict a point in time when the temperature of the battery exceeds a predetermined reference temperature based on the trend of battery temperature change, and to start cooling the battery before reaching the predicted excess point.

The controller may be configured to compare a learned fuel economy of the eco-friendly vehicle with a current fuel economy and determine that the vehicle to be towed is connected to the eco-friendly vehicle in response to the current fuel economy being relatively lower than the learned fuel economy.

The controller may be configured to identify the connection of the vehicle to be towed from information directly input by a user through a user interface.

The controller may be configured to compare a braking current and determine that the vehicle to be towed is connected to the eco-friendly vehicle in response to an increase of the braking current increases by more than a preset size.

The controller may be configured to compare a current consumption of the battery and determine that the vehicle to be towed is connected to the eco-friendly vehicle in response to an increase in the current consumption of the battery by more than a preset size.

The controller may be configured to determine that the vehicle to be towed is connected to the eco-friendly vehicle from the generation of a towing flag generated when the eco-friendly vehicle and the vehicle to be towed are connected.

The controller may be further configured to immediately start cooling of the battery in response to a case where the temperature of the battery has already exceeded the predetermined reference temperature.

The controller may be configured to wait before reaching the predicted excess point in response to the case where the temperature of the battery has not yet exceeded the predetermined reference temperature, and then to start cooling the battery before reaching the predicted excess point.

The predetermined function may be provided using regression analysis.

The regression analysis may include either a Lagrange interpolation method or a least squares method.

According to another aspect of the disclosure, there is provided a method of controlling an eco-friendly vehicle including measuring, by a controller, a temperature of a battery during towing driving while a vehicle to be towed is connected, applying, by the controller, the measured battery temperature to a predetermined function to obtain a trend of battery temperature change, predicting, by the controller, a point in time when the temperature of the battery exceeds a predetermined reference temperature based on the trend of battery temperature change, immediately starting, by the controller, cooling of the battery in response to a case where the temperature of the battery has already exceeded the predetermined reference temperature, and waiting, by the controller, before reaching the predicted excess point in response to the case where the temperature of the battery has not yet exceeded the predetermined reference temperature, and then starting cooling the battery before reaching the predicted excess point.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Figure 1:
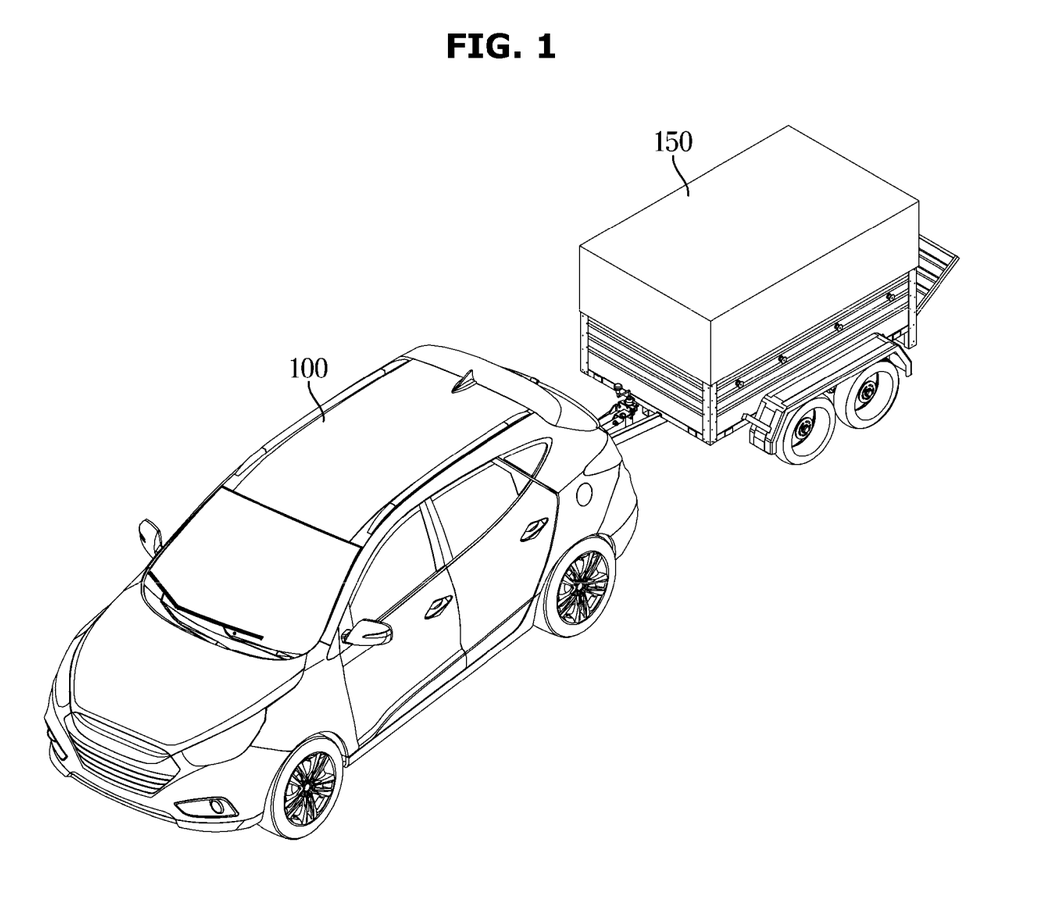
FIG. 1 is a view illustrating a state in which a vehicle to be towed is connected to an eco-friendly vehicle according to an embodiment of the disclosure.

FIG. 1 is a view illustrating a state in which a vehicle to be towed is connected to an eco-friendly vehicle according to an embodiment of the disclosure.

Referring to FIG. 1, an eco-friendly vehicle 100 according to an embodiment of the disclosure is a subject of towing a vehicle to be towed 150, and the vehicle to be towed 150 is an object of traction that is towed by the eco-friendly vehicle 100. The vehicle to be towed 150 may include a camping trailer or a cargo transport trailer or a jet-ski transport loader, for example.

The eco-friendly vehicle 100 is a vehicle that uses power from a battery as energy, and may be an electric vehicle or a hybrid vehicle.

The eco-friendly vehicle 100 may be connected to enable communication with the vehicle to be towed 150. The eco-friendly vehicle 100 and the vehicle to be towed 150 exchange driving information, vehicle state information, and towing state information through mutual communication.

Figure 2:
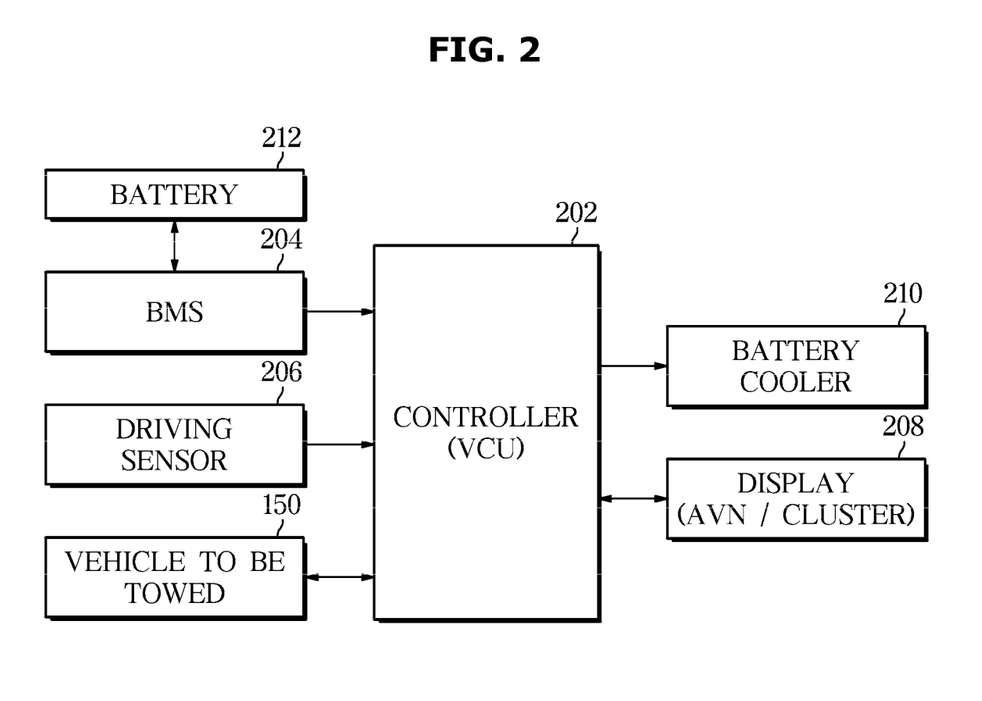
FIG. 2 is a view illustrating a control system of a vehicle according to an embodiment of the disclosure.

FIG. 2 is a view illustrating a control system of a vehicle according to an embodiment of the disclosure. In FIG. 2, a controller 202 may be a vehicle control unit (VCU).

As illustrated in FIG. 2, a battery manager (battery management system BMS) 204 may be connected to an input side of the controller 202 provided to control an overall environment of the eco-friendly vehicle 100 to enable communication. The battery manager 204 may transmit state information of a battery 212 to the controller 202. The state information of the battery 212 that the controller 202 receives from the battery manager 204 may include temperature information of the battery 212.

In addition, the controller 202 may receive driving state information generated during the driving of the eco-friendly vehicle 100 from a driving sensor 206. For example, the controller 202 may obtain information related to the speed, acceleration/deceleration, and braking of the eco-friendly vehicle 100 or the vehicle to be towed 150 through the driving sensor 206.

In addition, the controller 202 may communicate with the vehicle to be towed 150 to exchange driving information, vehicle state information, and towing state information of the eco-friendly vehicle 100 and the vehicle to be towed 150.

A battery cooler 210 and a display 208 may be connected to an output side of the controller 202 to enable communication.

The battery cooler 210 is a device for managing a temperature of the battery 212 to a desired optimum temperature. When the vehicle to be towed 150 is connected to the eco-friendly vehicle 100, since a driving load of the eco-friendly vehicle 100 increases significantly, a current consumption of the battery 212 provided in the eco-friendly vehicle 100 also increases significantly. As a result, the temperature of the battery 212 may increase significantly. Therefore, when the temperature of the battery 212 excessively increases while the eco-friendly vehicle 100 is driving, the battery cooler 210 cools the battery 212, thereby lowering the temperature of the battery 212. In an embodiment of the disclosure, the controller 202 may perform a battery optimization mode during traction (towing) driving of the eco-friendly vehicle 100, and manage the temperature of the battery 212 to be maintained within an optimum temperature range by predicting the temperature of the battery 212 in the battery optimization mode and driving the battery cooler 210 in advance.

The display 208 may be an audio video navigation (AVN) or a display of a cluster. The controller 202 may display various guide messages or questions on the display 208 and receive input from a user (driver). To this end, the display 208 may be a touch input method.

Figure 3:
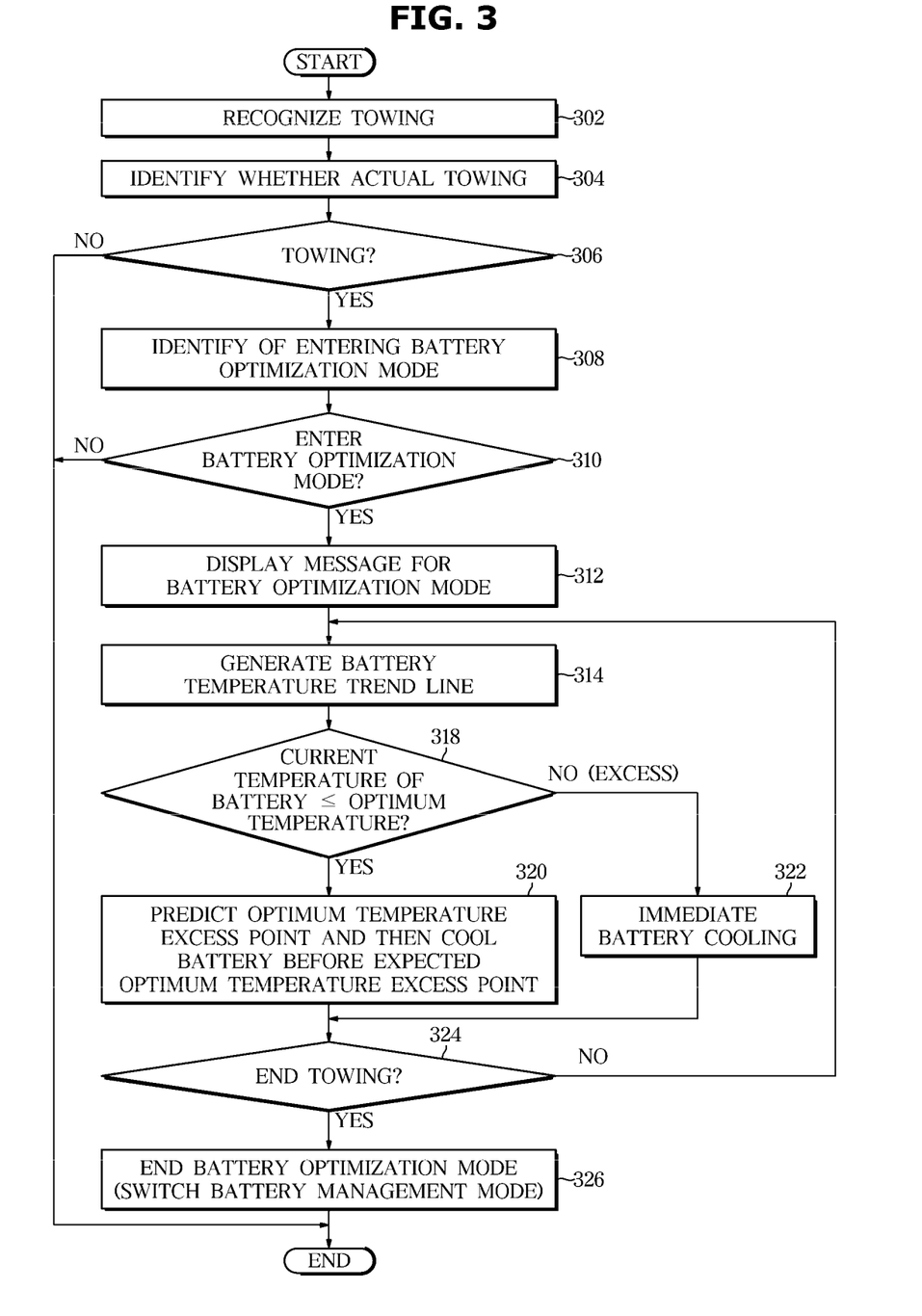
FIG. 3 is a view illustrating a method of controlling a vehicle according to an embodiment of the disclosure.

FIG. 3 is a view illustrating a method of controlling a vehicle according to an embodiment of the disclosure. A vehicle control method illustrated in FIG. 3 is performed based on the device configurations of FIGS. 1 and 2, and is to maintain the temperature of the battery 212 within the optimum temperature range by controlling the battery cooler 210 according to whether the eco-friendly vehicle 100 is towed (towing).

As illustrated in FIG. 3, the controller 202 may recognize whether the eco-friendly vehicle 100 is towed (towing) when an engine of the eco-friendly vehicle 100 is turned on or when the eco-friendly vehicle 100 starts driving at 302. The controller 202 may use the following methods to recognize whether the eco-friendly vehicle 100 is towed.

A first method is to compare an existing learned fuel economy with a current actual fuel economy. When the current actual fuel economy is relatively significantly lower than the existing learned fuel economy, it may be recognized that the vehicle to be towed 150 is connected to the eco-friendly vehicle 100 and is being towed.

A second method is to use direct user input. By inducing the user (driver) to directly input whether or not towing through a user interface displayed on the display 208, it is possible to recognize whether the vehicle to be towed 150 is connected from the user input.

A third method is to use comparison of braking currents. When the eco-friendly vehicle 100 and the vehicle to be towed 150 are connected to enable communication, a braking light of the vehicle to be towed 150 is also turned on when the eco-friendly vehicle 100 is braked, so that the braking current is relatively largely increased compared to a case of non-towing driving. Therefore, it is possible to recognize whether the vehicle to be towed 150 is connected from an increase in the braking current.

A fourth method is to use a comparison of the battery current. A battery current map for each motor torque or a battery current map for each battery temperature is secured in advance, and whether the vehicle to be towed 150 is connected from a change in the battery current (consumed current) is recognized. While the eco-friendly vehicle 100 is towing the vehicle to be towed 150, since the current consumption of the battery 212 is relatively very large, it is possible to recognize whether the vehicle to be towed 150 is connected through the change in the battery current.

A fifth method is a method of identifying whether the controller 202 receives a towing flag. When the vehicle to be towed 150 is connected to the eco-friendly vehicle 100, the eco-friendly vehicle 100 and the vehicle to be towed 150 are mechanically connected, as well as between a state in which communication between the eco-friendly vehicle 100 and the vehicle to be towed 150 is possible through an electrical connection. At this time, the towing flag is generated and transmitted to the controller 202. The controller 202 may recognize that the vehicle to be towed 150 is connected to the eco-friendly vehicle 100 through a reception of the towing flag.

Figure 4:
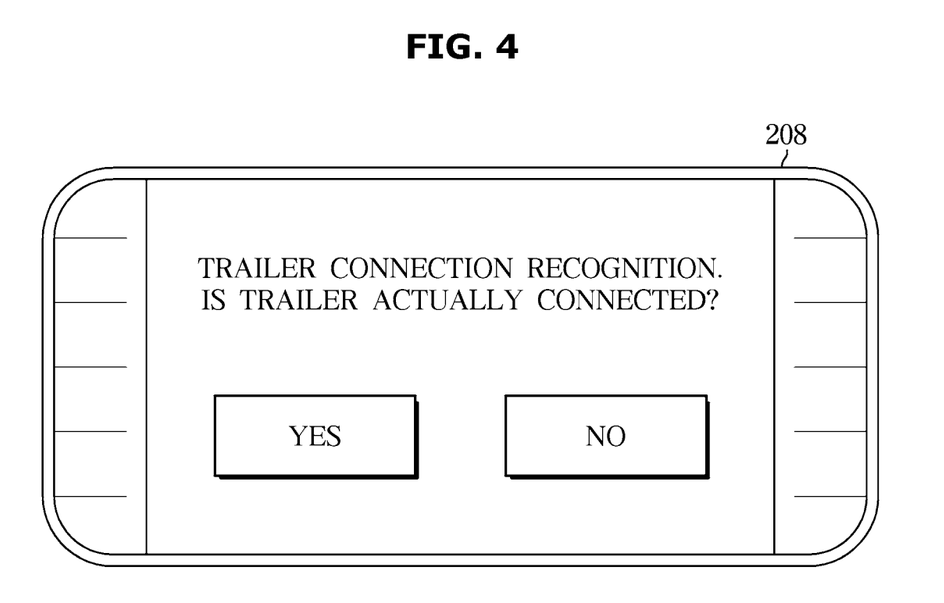
FIG. 4 is a view illustrating an example of a message for identifying whether a vehicle to be towed is connected to an eco-friendly vehicle.

After recognizing whether the eco-friendly vehicle 100 is towed through any one of the first, third, fourth, and fifth methods among various methods, the controller 202 may display a guide message on the display 208 and identify whether or not the user is actually towed at 304. For example, as illustrated in FIG. 4, by displaying a message such as "Trailer connection recognition. Is the trailer actually connected?" and allowing the user to select either a 'Yes' button or a 'No' button. It is possible to identify whether the vehicle to be towed 150 (for example, the trailer) is actually connected.

In the second method among the four methods mentioned above, since the user directly inputs whether or not towing, a process of confirming whether or not towing to the user may be omitted.

Figure 5:
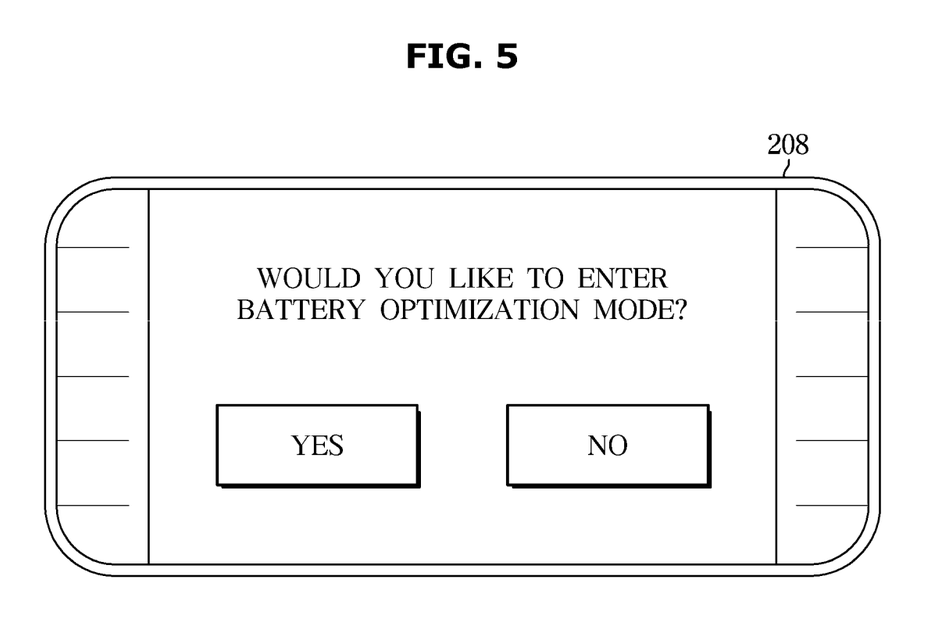
FIG. 5 is a view illustrating an example of a message for identifying whether or not a battery optimization mode is started to a user.

Returning to FIG. 3, when the vehicle to be towed 150 is actually connected to the eco-friendly vehicle 100 (YES in 306), the controller 202 may identify to the user (driver) whether the vehicle to be towed 150 enters the battery optimization mode considering the connection at 308. For example, as illustrated in FIG. 5, by displaying a message such as "Would you like to start battery optimization mode?" on the display 208 and allowing the user to select either the 'Yes' button or the 'No' button, the user's intention to implement of the battery optimization mode may be identified.

Figure 6A:
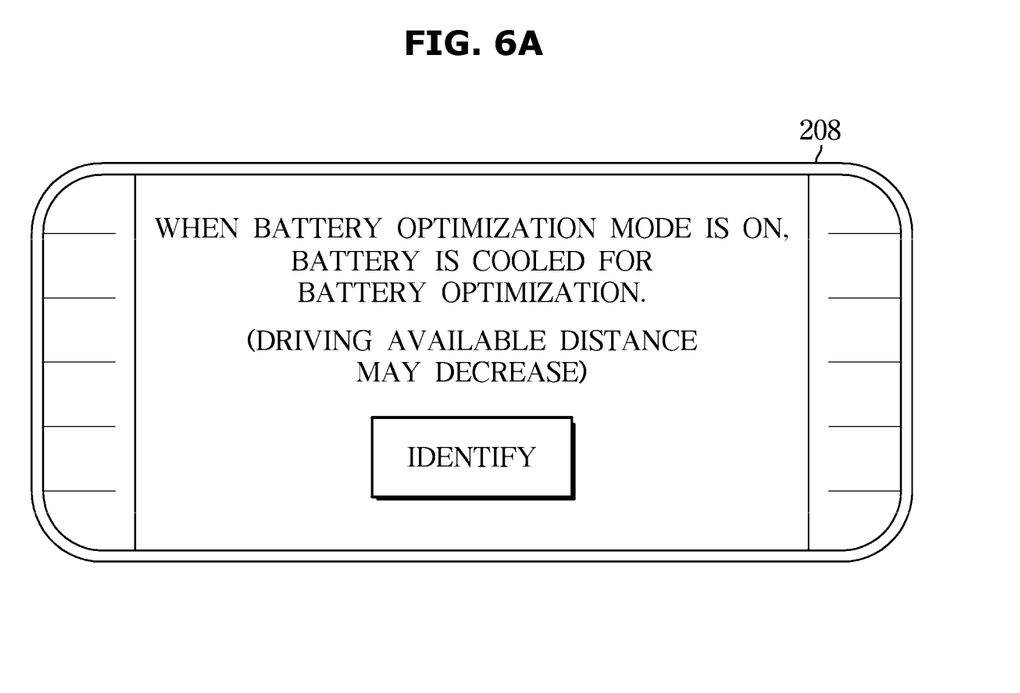
FIGS. 6A and 6B are views illustrating example messages according to on/off of a battery optimization mode.

Returning to FIG. 3, when the user selects the implementation of the battery optimization mode (YES in 310), the controller 202 may display a guide message for the battery optimization mode on the display 208 prior to the start of the battery optimization mode at 312. For example, when the user selects to perform the battery optimization mode, as illustrated in FIG. 6A, by displaying a guide message such as "When the battery optimization mode is ON, the battery is cooled for optimization of the battery. (A driving available distance may decrease)" on the display 218, the user is guided to recognize that the battery can be cooled in the battery optimization mode and that the driving available distance can be reduced due to the battery cooling.

Figure 6B:
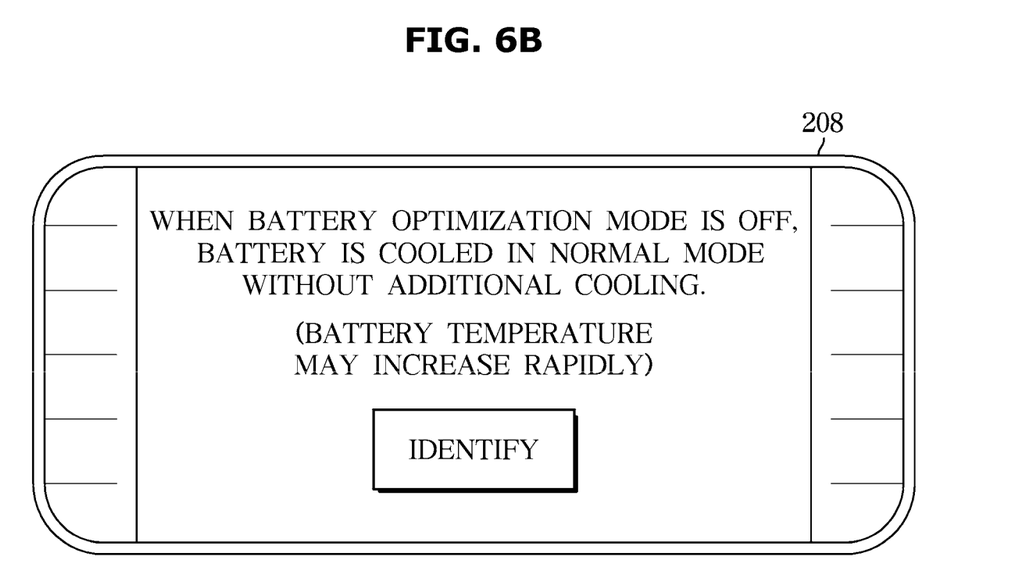

Conversely, when the user does not select the implementation of the battery optimization mode (NO in 310), the controller 202 may maintain general control without starting the battery optimization mode. In addition, in order to notify the user of a situation (battery temperature rise) that may occur when the user does not select the start of the battery optimization mode despite the vehicle to be towed 150 being connected (towing state), as illustrated in FIG. 6B, by displaying a guide message such as "Battery optimization mode is turned off, battery cooling is performed in a normal mode without additional cooling. (Battery temperature may increase rapidly)", it is possible to guide the user to recognize that the battery optimization is not performed and the temperature of the battery 212 may increase rapidly by not performing the battery optimization mode while the vehicle to be towed 150 is connected.

Returning to FIG. 3, the controller 202 may start the battery optimization mode in response to the user's selection to implement the battery optimization mode and generate a battery temperature trend line at 314. The controller 202 may generate the battery temperature trend line by reflecting a battery temperature trend line function. The battery temperature trend line function may be obtained by using 'regression analysis method'. The 'regression analysis method' is a method of obtaining a model between two variables for observed continuous variables and measuring a fitness, for example, 'Lagrange interpolation method' or 'least squares method'. In the 'regression analysis method', since the accuracy increases as data is accumulated, a more accurate battery temperature trend line may be generated as a towing driving distance of the eco-friendly vehicle 100 increases.

Figure 7A:
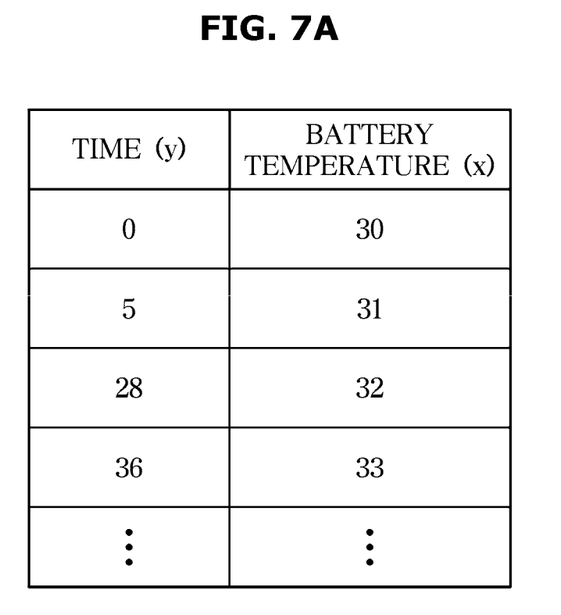
FIGS. 7A and 7B are views illustrating examples of a battery temperature trend line.
Figure 7B:
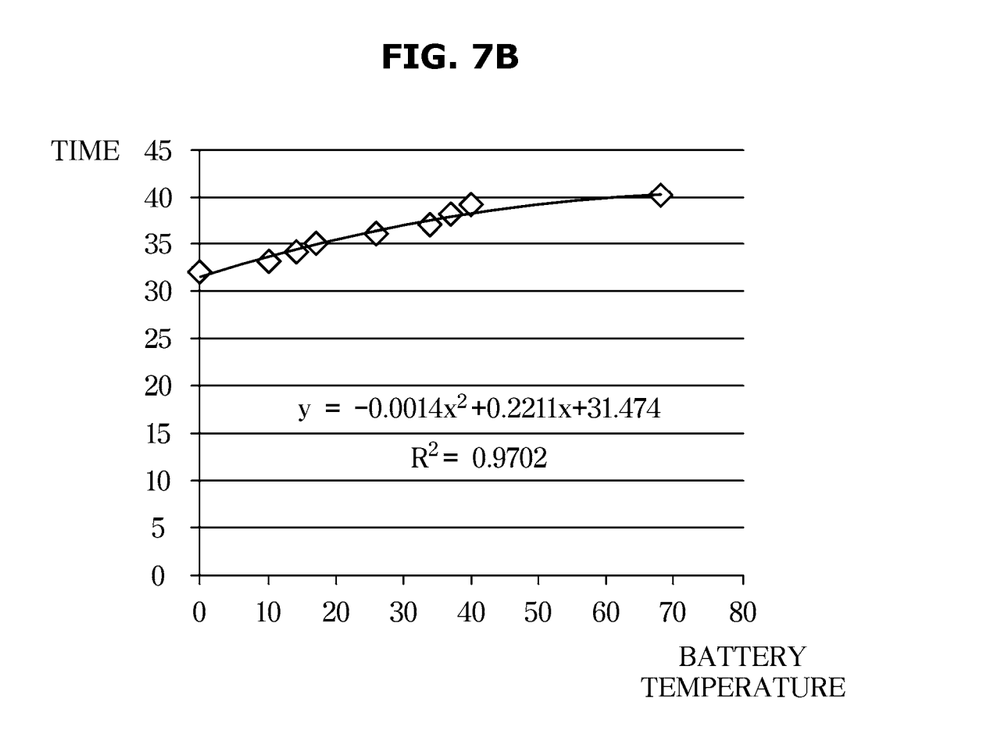

FIGS. 7A and 7B are views illustrating an example of a battery temperature trend line.

As illustrate in FIG. 7A, the battery temperature for each time is measured and stored during the towing driving, and the battery temperature trend line as illustrated in FIG. 7B is generated by reflecting the data of the battery temperature for each time to the battery temperature trend function to which the regression analysis method is applied. Using the battery temperature trend line, it is possible to predict the change in battery temperature from a present point to a near future.

Returning to FIG. 3, the controller 202 may identify whether a current temperature of the battery 212 is below a predetermined optimum temperature at 318. The controller 202 may manage the battery 212 in two different ways, depending on whether the current temperature of the battery 212 is below or exceeding the predetermined optimum temperature.

When the current temperature of the battery 212 is less than the predetermined optimum temperature (YES in 318), the controller 202 may predict a point in time when the temperature of the battery 212 exceeds the predetermined optimum temperature from the battery temperature trend line. Then, before the time when the battery 212 is expected to exceed the predetermined optimum temperature, the battery 212 is cooled in advance at 320. Since the temperature of the battery 212 is below the predetermined optimum temperature, it is not necessary to start cooling the battery 212 for temperature management. Therefore, unnecessary driving of the battery cooler 210 may be prevented. In this state, when it is predicted from the battery temperature trend line that the temperature of the battery 212 will exceed the predetermined optimum temperature, by driving the battery cooler 210 in advance to cool the battery 212 before reaching the predicted excess predicted time, it is possible to optimize the temperature of the battery 212 in advance before the temperature of the battery 212 exceeds the predetermined optimum temperature.

Figure 8:
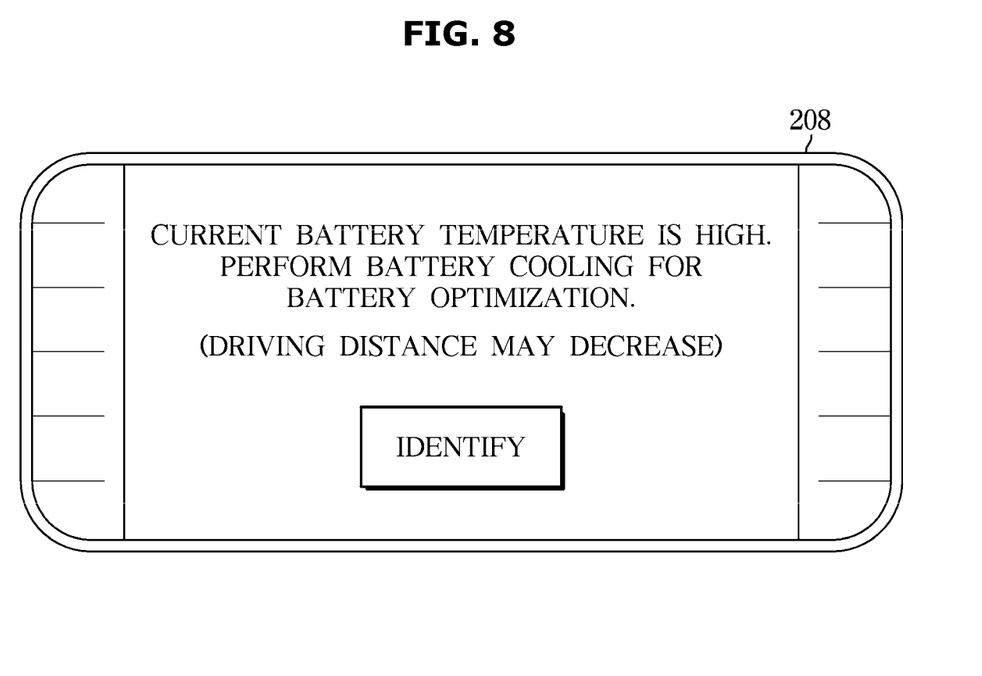
FIG. 8 is a view illustrating an example of a message when starting a battery optimization mode.

In operation 318, when the current temperature of the battery 212 exceeds the predetermined optimum temperature (NO in 318), the controller 202 immediately drives the battery cooler 210 to cool the battery 212 at 322. Since the current temperature of the battery 212 has already exceeded the predetermined optimum temperature, the battery cooler 210 is immediately driven to quickly lower the temperature of the battery 212 to below the optimum temperature. At this time, as illustrated in FIG. 8, the controller 202 may display a message such as "The current battery temperature is high. The battery is cooling for battery optimization. (The driving distance may decrease)" to notify the user (driver) of the current state of the battery 212 and the possibility of a reduction in the driving available distance accordingly. The cooling using the battery cooler 210 is continuously performed until the temperature of the battery 212 is lowered below the predetermined optimum temperature.

Figure 9:
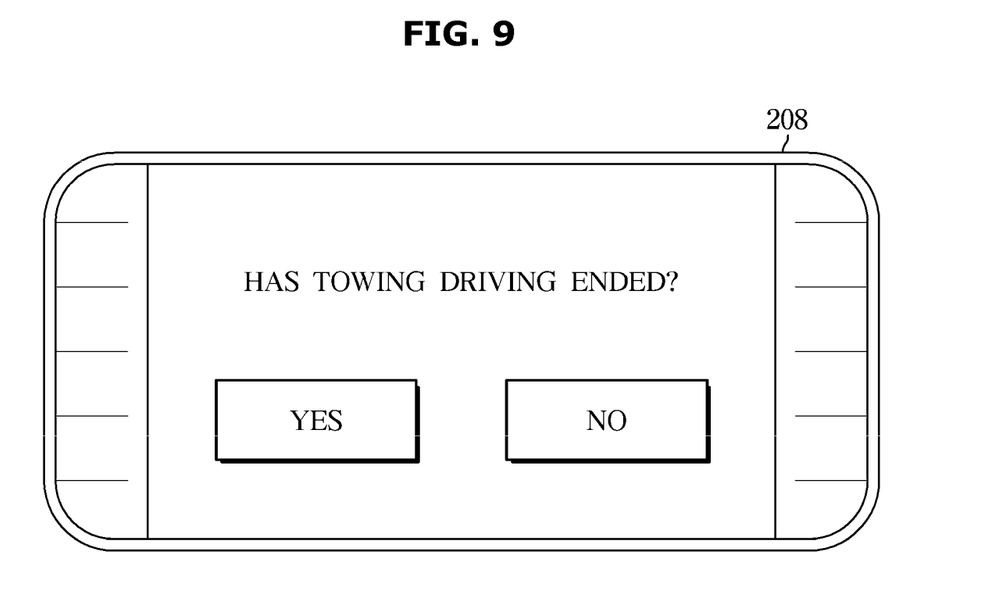
FIG. 9 is a view illustrating an example of a message for identifying whether a towing driving is ended.

When the temperature of the battery 212 falls below the predetermined optimum temperature, the controller 202 may identify whether the towing driving of the eco-friendly vehicle 100 has ended at 324. A method of identifying whether the towing driving of the eco-friendly vehicle 100 has ended may be to apply any one of the five methods mentioned in the description of operation 302 above. For example, any one of the method of comparing the existing learned fuel economy with the current fuel economy (the first method of 302), the method of using the user's direct input (the second method of 302), the method of using comparison of the braking current (the third method of 302), the method of using comparison of the battery current (the fourth method of 302), and the deletion (recognition) of the towing flag (the fifth method of 302) may be used. In the second method, as illustrated in FIG. 9, a process of identifying to the user whether the towing driving has actually ended by displaying a message such as "Is towing driving ended?" may be involved. In the case of the fifth method, it can be identified that the towing is ended by deleting (removing) the towing flag that has occurred.

Returning to FIG. 3, when it is determined that the towing driving of the eco-friendly vehicle 100 is not completed and continues (NO in 324), the controller 202 may return to the battery temperature trend line generation operation of 314 and continue to generate the battery temperature trend line.

When it is determined that the towing driving of the eco-friendly vehicle 100 is completed (YES in 324), the controller 202 may end the battery optimization mode and switch to the previous battery management mode (for example, battery management mode in non-towing driving) at 326.

According to an aspect of the disclosure, it is possible to optimize the temperature of the battery of the eco-friendly vehicle towing the vehicle to be towed.

The disclosed embodiments are merely illustrative of the technical idea. Those having ordinary skill in the art should appreciate that various modifications, changes, and substitutions may be made without departing from the essential characteristics thereof. Therefore, the embodiments disclosed above, and the accompanying drawings, are not intended to limit the technical idea, but to describe the technical spirit of the disclosure. The scope of the technical idea is not limited by the embodiments and the accompanying drawings. The scope of protection shall be interpreted by the following claims, and all technical ideas within the scope of equivalent shall be interpreted as being included in the scope of rights.

The invention claimed is:

1. A method of controlling an eco-friendly vehicle comprising:
   measuring, by a controller, a temperature of a battery during towing driving while a vehicle to be towed is connected;
   applying, by the controller, the measured battery temperature to a predetermined function to obtain a trend of battery temperature change;
   predicting, by the controller, a point in time when the temperature of the battery exceeds a predetermined reference temperature based on the trend of battery temperature change; and
   starting, by the controller, cooling of the battery before reaching the predicted point in time.

2. The method according to claim 1, further comprising:
   comparing, by the controller, a learned fuel economy of the eco-friendly vehicle with a current fuel economy, and determining that the vehicle to be towed is connected to the eco-friendly vehicle when the current fuel economy is lower than the learned fuel economy.

3. The method according to claim 1, further comprising:
   identifying, by the controller, the connection of the vehicle to be towed from information directly input by a user through a user interface.

4. The method according to claim 1, further comprising:
   comparing, by the controller, a braking current, and determining that the vehicle to be towed is connected to the eco-friendly vehicle when the braking current increases by more than a preset amount.

5. The method according to claim 1, further comprising:
   comparing, by the controller, a current consumption of the battery, and determining that the vehicle to be towed is connected to the eco-friendly vehicle when the current consumption of the battery increases by more than a preset amount.

6. The method according to claim 1, further comprising:
determining, by the controller, that the vehicle to be towed is connected to the eco-friendly vehicle from a towing flag generated when the eco-friendly vehicle and the vehicle to be towed are connected.

7. The method according to claim 1, further comprising:
immediately starting, by the controller, cooling of the battery when the temperature of the battery has exceeded the predetermined reference temperature.

8. The method according to claim 1, further comprising:
waiting, by the controller, before reaching the predicted point in time when the temperature of the battery has not yet exceeded the predetermined reference temperature, and then starting cooling the battery before reaching the predicted point in time.

9. The method according to claim 1, wherein the predetermined function is determined using regression analysis.

10. The method according to claim 9, wherein the regression analysis comprises either a Lagrange interpolation method or a least squares method.

11. An eco-friendly vehicle comprising:
a motor;
a battery configured to store power for driving the motor;
a battery cooler configured to cool the battery; and
a controller configured to measure a temperature of the battery during towing driving while a vehicle to be towed is connected, apply the measured battery temperature to a predetermined function to obtain a trend of battery temperature change, predict a point in time when the temperature of the battery exceeds a predetermined reference temperature based on the trend of battery temperature change, and start cooling the battery before reaching the predicted point in time.

12. The eco-friendly vehicle according to claim 11, wherein the controller is configured to compare a learned fuel economy of the eco-friendly vehicle with a current fuel economy, and to determine that the vehicle to be towed is connected to the eco-friendly vehicle when the current fuel economy is lower than the learned fuel economy.

13. The eco-friendly vehicle according to claim 11, wherein the controller is configured to identify the connection of the vehicle to be towed from information directly input by a user through a user interface.

14. The eco-friendly vehicle according to claim 11, wherein the controller is configured to compare a braking current and determine that the vehicle to be towed is connected to the eco-friendly vehicle when the braking current increases by more than a preset amount.

15. The eco-friendly vehicle according to claim 11, wherein the controller is configured to compare a current consumption of the battery and determine that the vehicle to be towed is connected to the eco-friendly vehicle when the current consumption of the battery increases by more than a preset amount.

16. The eco-friendly vehicle according to claim 11, wherein the controller is configured to determine that the vehicle to be towed is connected to the eco-friendly vehicle a towing flag generated when the eco-friendly vehicle and the vehicle to be towed are connected.

17. The eco-friendly vehicle according to claim 11, wherein the controller is further configured to immediately start cooling of the battery when the temperature of the battery has exceeded the predetermined reference temperature.

18. The eco-friendly vehicle according to claim 11, wherein the controller is configured to wait before reaching the predicted point in time when the temperature of the battery has not yet exceeded the predetermined reference temperature, and then to start cooling the battery before reaching the predicted point in time.

19. The eco-friendly vehicle according to claim 11, wherein the predetermined function is determined using regression analysis.

20. The eco-friendly vehicle according to claim 19, wherein the regression analysis comprises either a Lagrange interpolation method or a least squares method.

21. A method of controlling an eco-friendly vehicle comprising:
measuring, by a controller, a temperature of a battery during towing driving while a vehicle to be towed is connected;
applying, by the controller, the measured battery temperature to a predetermined function to obtain a trend of battery temperature change;
predicting, by the controller, a point in time when the temperature of the battery exceeds a predetermined reference temperature based on the trend of battery temperature change;
immediately starting, by the controller, cooling of the battery when the temperature of the battery has exceeded the predetermined reference temperature; and
waiting, by the controller, before reaching the predicted point in time when the temperature of the battery has not yet exceeded the predetermined reference temperature, and then starting cooling the battery before reaching the predicted point in time.

* * * * *